United States Patent [19]

Engerand et al.

[11] Patent Number: 5,018,795
[45] Date of Patent: May 28, 1991

[54] VEHICLE WHEEL MADE OF COMPOSITE MATERIAL

[75] Inventors: Jean-Luc Engerand, Sceaux; Jean-Pierre Mattei, La Varenne, both of France

[73] Assignees: Messier-Hispano-Bugatti, Montrouge; R. Alkan & Cie, Valenton, both of France

[21] Appl. No.: 469,247

[22] Filed: Jan. 24, 1990

[30] Foreign Application Priority Data

Jan. 30, 1989 [FR] France .................. 89 01112

[51] Int. Cl.$^5$ .......... B60B 5/02; B60B 25/04
[52] U.S. Cl. .............. 301/63 PW; 301/9 R; 152/410
[58] Field of Search ....... 152/396, 409, 410, DIG. 10; 301/9 R, 9 DH, 9 CN, 9 AC, 35 SL, 63 PW, 95, 98

[56] References Cited

U.S. PATENT DOCUMENTS

| 2,038,212 | 4/1936 | Frank | 152/409 X |
| 2,105,317 | 1/1938 | Frank | 301/9 R X |
| 2,357,000 | 1/1941 | Hollerith | 152/406 |
| 2,651,348 | 9/1953 | Monette | 152/410 |
| 3,790,220 | 2/1974 | Manss | 152/411 X |
| 4,173,992 | 11/1979 | Lejeune | 301/63 PW X |

FOREIGN PATENT DOCUMENTS

| 919055 | 12/1945 | France . | |
| 932242 | 8/1946 | France . | |
| 2616712 | 12/1988 | France | 301/63 PW |
| 0658224 | 10/1986 | Switzerland | 301/95 |
| 572225 | 9/1945 | United Kingdom | 152/410 |

*Primary Examiner*—Russell D. Stormer
*Attorney, Agent, or Firm*—Sixbey, Friedman, Leedom & Ferguson

[57] ABSTRACT

The wheel of the invention comprises a rim and side walls made of composite material and removable beading on at least one side and preferably likewise made of composite material. The beading is mounted on the rim via a metal mounting belt which is fixed to the rim.

5 Claims, 1 Drawing Sheet

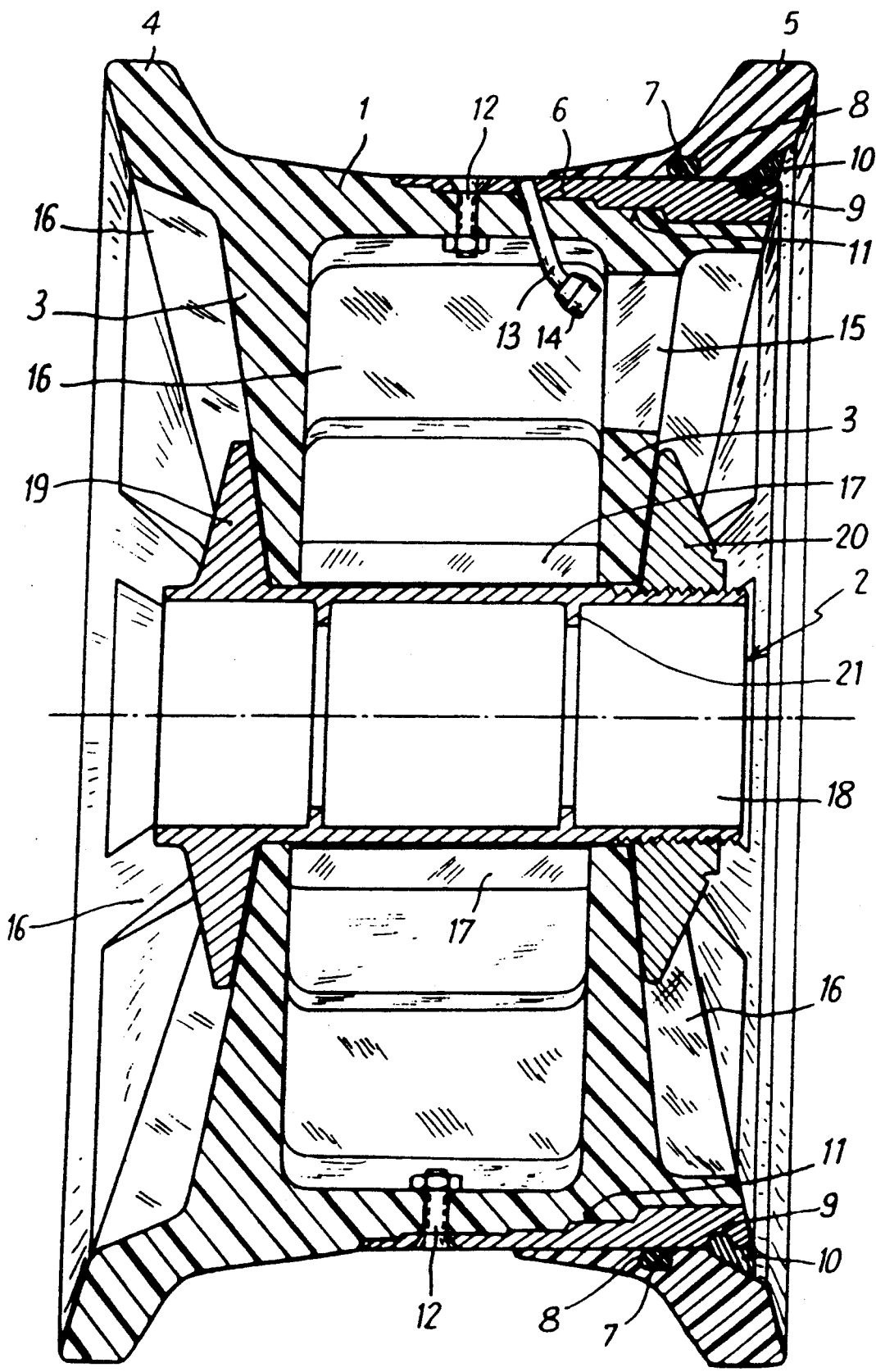

VEHICLE WHEEL MADE OF COMPOSITE MATERIAL

The present invention relates to a vehicle wheel made of composite material.

BACKGROUND OF THE INVENTION

It is known that it is desirable to make a vehicle, and in particular an aircraft, using components which are as light as possible while still having sufficient strength to withstand the stresses to which they are subjected. In particular, aircraft wheels must be capable of withstanding the very large stresses to which they are subjected during landing and while running on the ground. In addition, it is known that aircraft tires are incapable of being deformed sufficiently to enable the edges of their side walls to be passed over the beading of the wheel, and as a result it is necessary for an aircraft wheel to be dismountable in order to enable a tire to be installed on its rim. In this respect, it is known to make an aircraft wheel out of light alloy comprising a rim associated with a hub by at least one side wall and having removable beading mounted thereon in sealed manner and held in place on the rim on an assembly side thereof by a keeper.

In order to lighten vehicle wheels further, attempts have been made to make them of composite material, in particular carbon fiber embedded in an organic resin. However, it has been observed that a rim made of composite material does not have sufficient strength to withstand the stresses transmitted by the keeper. Attempts have therefore been made to make wheels of composite material comprising two portions which are connected to each other in a mid plane extending substantially perpendicularly to the axis of rotation of the wheel. However, it is difficult to mount a tire on the two separated portions and then reconnect them, and such a structure has therefore turned out to be unsatisfactory from a practical point of view.

An object of the invention is to provide a composite vehicle wheel having sufficient strength while nevertheless allowing a tire to be mounted easily on the wheel.

SUMMARY OF THE INVENTION

In order to achieve this object, the invention provides a vehicle wheel comprising a rim associated with the hub by at least one side wall and on which removable beading is mounted in sealed manner and fixed to the rim on an assembly side thereof by means of a keeper, wherein the rim and the side wall are made of composite material, and the rim comprises, on its periphery on the side where the removable beading is mounted, a metal mounting belt which is fixed to the rim and in which a positioning groove is provided for the keeper.

Thus, the metal mounting belt provides adequate strength for withstanding the stresses transmitted by the keeper and advantage is nevertheless obtained from the considerable reduction in weight due to the rim and the side wall both being made of composite material.

In an advantageous version of the invention, the mounting belt tapers in thickness going away from one of the edges of the rim towards a mid portion thereof. Thus, while still providing sufficient contact area between the mounting belt and the rim, and sufficient strength for the mounting belt level with the positioning groove for fixing purposes, the additional weight of the metal mounting belt is minimized.

In accordance with preferred aspects of the invention, the mounting belt has steps in its surface facing the rim, and it is glued to the rim; the removable beading is made of composite material; and the wheel includes two spaced-apart side walls with at least one stiffening member being disposed therebetween in the vicinity of the hub.

BRIEF DESCRIPTION OF THE DRAWING

An embodiment of the invention is described by way of example with reference to the accompanying drawing, in which the sole FIGURE is a diagrammatic section on a vertical diametral plane through a wheel of the invention.

DETAILED DESCRIPTION

With reference to the drawing, the wheel of the invention comprises a rim 1 made of composite material and associated with a metal hub 2 by means of side walls 3 likewise made of composite material and integral with the rim 1 and extending perpendicularly relative to the hub 2. Circular beading 4 is likewise integrally formed with the rim 1 of composite material and extends radially outwardly therefrom. On the side of the rim 1 opposite to its fixed beading 4, the wheel includes removable beading 5 likewise made of composite material.

The composite material used is, for example, a material including high strength carbon fibers bonded together by an organic resin.

A metal mounting belt 6, preferably a titanium belt when the composite material is placed on carbon fibers, is fixed to the periphery of the rim 1 on that side thereof on which the removable beading 5 is mounted. The face of the metal mounting belt 6 directed towards the removable beading 5 preferably has a generally smooth surface on which a sealing O-ring 7 received in an inside circular groove 8 of the bearing 5 may be brought to bear. Close to its outside edge, the mounting belt 6 has a circular groove 9 directed towards the removable beading 5 and in which a keeper 10 is engaged. On its face facing the rim 1, the mounting belt 6 has a surface with steps 11 disposed so that the thickness of the mounting belt tapers going from the edge of the rim towards its middle. The metal belt 6 can be fixed to the rim adequately by means of gluing. However, if so desired, and in order to improve the security of the assembly, a series of fasteners 12 may be provided extending radially through the metal belt and the rim. Naturally the rim also has an inflation tube 13 passing therethrough and terminated by a valve 14 which is made accessible from outside the wheel via an opening 15 through one of its side walls 3.

The side walls 3 are spaced apart in the axial direction of the wheel and the strength of the wheel is preferably reinforced by radial webs 16 extending between the side walls 3 and also beyond them.

In the embodiment shown, the strength of the wheel is further reinforced by metal or composite stiffening bars 17 disposed between the two side walls and in the vicinity of the hub.

The hub comprises a tubular body 18 fitted at one of its ends with a cheek piece 19 and at its other end with a removable thrust ring 20 which is fixed to the tubular body 18 in appropriate manner, e.g. by means of a screw thread. The tubular body 18 also includes internal annular ribs 21 for bearing against ball bearings during assembly of the wheel on its axle.

Naturally the invention is not limited to the embodiment described and variants can be made thereto without going beyond the scope of the invention, in particular, the two spaced-apart side walls 3 could be replaced by a single side wall of adequate thickness for providing the necessary strength in the connection between the rim and the hub.

Similarly, although the embodiment shown has removable beading 5 on one side only, it would also be possible to make the opposite beading removable as well, in which case the rim would be fitted with a second metal mounting belt, or else with a single metal belt for use in mounting removable beading on both sides.

Although one application of the invention is particularly intended for aircraft wheels, the invention can nevertheless be used for other vehicles, in particular for trucks or cars.

We claim:

1. A vehicle wheel comprising a rim associated with a hub by at least one side wall and on which removable beading is mounted in sealed manner and fixed to the rim on a side thereof by means of a keeper, wherein the rim and the side wall are made of composite material, and the rim comprises, on its periphery on the side where the removable beading is mounted, a metal mounting belt which is fixed to the rim, said metal mounting belt being provided with a positioning groove for said keeper.

2. A vehicle wheel according to claim 1, wherein the mounting belt tapers in thickness going away from one of the edges of the rim towards a mid portion thereof.

3. A vehicle wheel according to claim 2, wherein the mounting belt has steps in its surface facing the rim, and wherein it is glued to the rim.

4. A vehicle wheel according to claim 1, wherein the removable beading is made of composite material.

5. A vehicle wheel according to claim 1, including two spaced-apart side walls with at least one stiffening member being disposed therebetween in the vicinity of the hub.

* * * * *